(12) United States Patent
Gorisse et al.

(10) Patent No.: US 9,362,818 B2
(45) Date of Patent: Jun. 7, 2016

(54) HIGH EFFICIENCY DC-DC CONVERTER

(75) Inventors: Philippe Gorisse, Midi-Pyrenees (FR); Nadim Khlat, Midi-Pyrenees (FR)

(73) Assignee: RF Micro Devices, Inc., Greensboro, NC (US)

( * ) Notice: Subject to any disclaimer, the term of this patent is extended or adjusted under 35 U.S.C. 154(b) by 111 days.

(21) Appl. No.: 13/013,986

(22) Filed: Jan. 26, 2011

(65) Prior Publication Data

US 2011/0204962 A1 Aug. 25, 2011

Related U.S. Application Data

(60) Provisional application No. 61/306,265, filed on Feb. 19, 2010.

(51) Int. Cl.
H02M 3/07 (2006.01)

(52) U.S. Cl.
CPC .......... *H02M 3/07* (2013.01); *H02M 2003/072* (2013.01)

(58) Field of Classification Search
CPC .................. H02M 3/072; H02M 2003/072
USPC ................ 327/536; 307/109–110; 363/59–60
See application file for complete search history.

(56) References Cited

U.S. PATENT DOCUMENTS

| | | | | |
|---|---|---|---|---|
| 4,451,743 A * | 5/1984 | Suzuki | ............... | H02M 3/07 307/110 |
| 5,414,614 A * | 5/1995 | Fette et al. | ............... | 363/59 |
| 6,055,168 A * | 4/2000 | Kotowski et al. | ............... | 363/60 |
| 6,169,673 B1 * | 1/2001 | McIntyre | ............... | H02M 3/07 363/59 |
| 6,188,274 B1 * | 2/2001 | Vernon | ............... | 327/589 |
| 6,563,235 B1 | 5/2003 | McIntyre et al. | | |
| 6,927,441 B2 * | 8/2005 | Pappalardo et al. | ............... | 257/299 |
| 7,456,677 B1 * | 11/2008 | Rao | ............... | H02M 3/07 327/536 |
| 7,457,592 B2 | 11/2008 | Arayashiki | | |
| 7,518,892 B2 * | 4/2009 | Kitagawa | ............... | H02M 3/07 363/59 |
| 7,531,996 B2 * | 5/2009 | Yang et al. | ............... | 323/282 |
| 7,557,641 B2 | 7/2009 | Georgescu et al. | | |
| 7,602,232 B2 | 10/2009 | Georgescu et al. | | |
| 7,705,560 B2 * | 4/2010 | Johnson | ............... | 320/117 |

(Continued)

FOREIGN PATENT DOCUMENTS

WO WO2009067591 * 5/2009 .............. H02M 3/07

OTHER PUBLICATIONS

Non-final Office Action for U.S. Appl. No. 12/706,544 mailed Jan. 25, 2012, 10 pages.

(Continued)

*Primary Examiner* — Thomas J Hiltunen
(74) *Attorney, Agent, or Firm* — Withrow & Terranova, P.L.L.C.

(57) ABSTRACT

A charge pump includes an input, an output, and a fixed voltage node; a first capacitor and at least a second capacitor; and a plurality of switches adapted to selectively couple the first capacitor and the at least the second capacitor to the input, the output, and the fixed voltage node. A switch controller is adapted to switch the plurality of switches in response to at least three phase signals to provide fixed gains. A phase generator is adapted to generate the at least three phase signals, wherein at least one of the at least three phase signals has a duty cycle that is different from at least one other of the at least three phase signals. The phase generator is also adapted to adjust the frequency of a clock signal used to generate the at least three phase signals so that a minimum switching frequency is provided.

24 Claims, 8 Drawing Sheets

(56) References Cited

U.S. PATENT DOCUMENTS

| | | | |
|---|---|---|---|
| 7,884,665 B2 * | 2/2011 | Saikusa | H02J 7/0044 307/110 |
| 7,990,742 B2 * | 8/2011 | Lesso | 363/62 |
| 8,044,706 B2 * | 10/2011 | Saman et al. | 327/536 |
| 8,089,788 B2 * | 1/2012 | Jain | 363/65 |
| 8,223,514 B2 * | 7/2012 | Kajino | H02M 3/07 323/288 |
| 8,259,476 B2 * | 9/2012 | Ben-Yaakov | H02M 3/07 363/60 |
| 8,710,911 B2 * | 4/2014 | Chien | G05F 3/02 327/536 |
| 2004/0167407 A1 * | 8/2004 | Roberts | 600/485 |
| 2007/0182490 A1 | 8/2007 | Hau et al. | |
| 2007/0236197 A1 | 10/2007 | Vo | |
| 2008/0220826 A1 | 9/2008 | Dagher et al. | |
| 2011/0101938 A1 * | 5/2011 | Ma et al. | 323/282 |
| 2011/0227633 A1 * | 9/2011 | Mo et al. | 327/517 |
| 2012/0062205 A1 * | 3/2012 | Levesque et al. | 323/318 |

OTHER PUBLICATIONS

Final Rejection mailed May 10, 2012, for U.S. Appl. No. 12/706,544, 15 pages.

* cited by examiner

| CHARGE PUMP GAIN | PHASE 1 CLOSED SWITCHES | PHASE 2 CLOSED SWITCHES | PHASE 3 CLOSED SWITCHES | CONSTANTLY OPEN SWITCHES |
|---|---|---|---|---|
| 1/4 | S1, S5, S9 | S7, S8 | S3, S9, S10 | S2, S4, S6 |
| 1/3 | S1, S5, S9 | S2, S3, S7, S8 | NO PHASE 3 | S4, S6, S10 |
| 1/2 | S1, S4, S6, S9 | S2, S3, S7, S8 | NO PHASE 3 | S5, S10 |
| 2/3 | S1, S4, S6, S9 | S2, S5, S8 | NO PHASE 3 | S3, S7, S10 |
| 3/4 | S4, S10, S11 | S6, S9 | S2, S5, S8 | S1, S3, S7 |

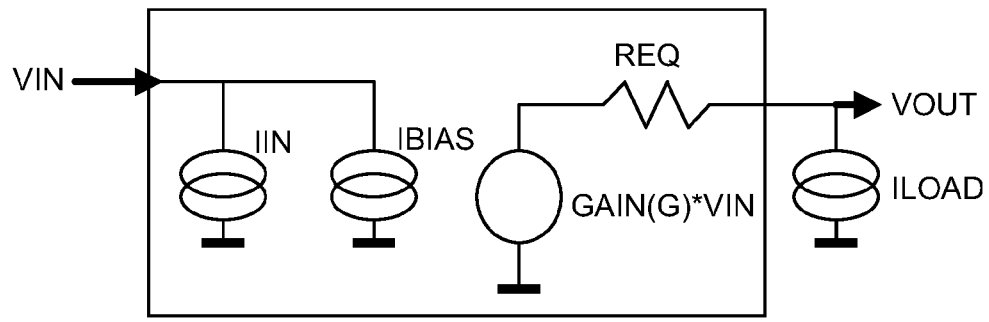
*FIG. 8A*
| GAIN(G) | REQ(Ω) | IBIAS(mA) |
|---|---|---|
| 2/3 | 1.4 | 1.3 |
| 1/2 | 0.9 | 1.4 |
| 1/3 | 1.4 | 1.2 |
*FIG. 8B*
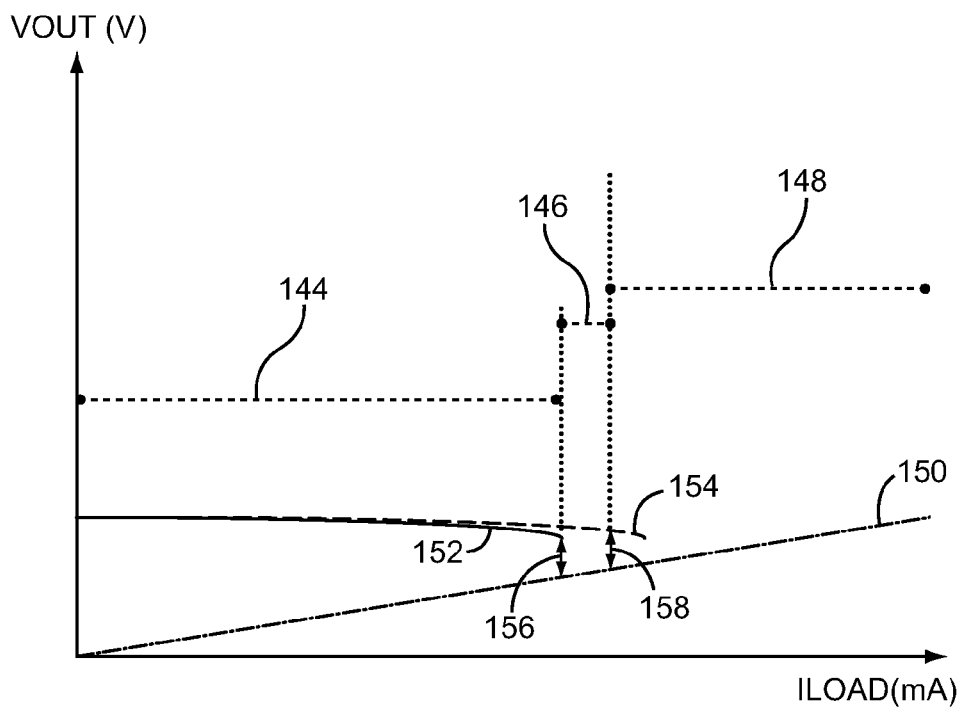
*FIG. 9*

HIGH EFFICIENCY DC-DC CONVERTER

RELATED APPLICATIONS

This application claims the benefit of provisional patent application Ser. No. 61/306,265, filed Feb. 19, 2010, the disclosure of which is hereby incorporated herein by reference in its entirety.

This application is related to U.S. patent application Ser. No. 12/706,544, entitled "HIGH-EFFICIENCY LOW-COST POWER SUPPLY FOR RADIO FREQUENCY SYSTEMS," which was filed on Feb. 16, 2010, and which is hereby incorporated herein by reference in its entirety.

FIELD OF THE DISCLOSURE

The present disclosure relates to high efficiency inductor-less direct current (DC) to DC converters, which may be used in radio frequency (RF) user equipment (UE) such as cellular telephone handsets.

BACKGROUND

As wireless technology evolves, the number and variations of wireless communication protocols increase and may encompass multiple operating modes, including half-duplex and full duplex modes, multiple frequency bands, and various transmit power levels. As a result, portable wireless communication products such as cellular telephone handsets may need to provide support for such protocols. Therefore, radio frequency (RF) architectures of wireless communication products may be complex. Further, portable wireless communication products are typically battery powered. As such, power consumption in portable wireless products may need to be as low as possible to maximize battery life. Therefore, portable wireless communication products that provide support for many wireless communication protocols may need to have low power consumption, regardless of which wireless communication protocol is being used.

A significant portion of the power used in a portable wireless communication product may be consumed by a power supply that provides power to the portable wireless communication product. The efficiency of the power supply should be as high as possible to minimize overall power consumption. Moreover, the power supply should minimize any spurious noise generated by the power supply while supplying power to noise-sensitive circuitry such as receivers and power amplifiers (PAs). Thus, there is a need for a power supply that operates efficiently without regard to operating modes, and while doing so generates a minimal amount of spurious noise.

SUMMARY

The present disclosure provides a power supply in the form of an inductor-less direct current (DC) to DC converter that operates efficiently without regard to operating modes, and while doing so generates a minimal amount of spurious noise. In particular, the present disclosure provides a charge pump that is an inductor-less DC to DC converter. The charge pump of the present disclosure includes an input, an output, and a fixed voltage node; a first capacitor and at least a second capacitor, each having first and second terminals; and a plurality of switches adapted to selectively couple the first and second terminals of the first capacitor and the at least the second capacitor to the input, the output, and the fixed voltage node.

The charge pump further includes a switch controller adapted to open and close select ones of the plurality of switches in response to a first phase signal, a second phase signal, and at least a third phase signal in order to provide at the output a fixed set of gains of a voltage at the input. A phase generator is adapted to generate the first phase signal, the second phase signal, and the at least the third phase signal, wherein at least one of the first phase signal, the second phase signal, and the at least the third phase signal has a period with a duty cycle that is different from at least one other of the first phase signal, the second phase signal, and the at least the third phase signal. For the purposes of this disclosure, a duty cycle of a signal is defined as the ratio of the time the signal is at a logic one level versus the time the signal is at the logic one level plus the time the signal is at a logic zero level (i.e., the signal's period) during a signal cycle.

The phase generator is also adapted to adjust the frequency of a clock signal that provides a reference to generate the first phase signal, the second phase signal, and the at least the third phase signal such that a lowest switching frequency is used under various operating modes to minimize the generation of spurious noise during operation. Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 8A is a diagram of a model of the charge pump of FIG. 2.

FIG. 8B is a table relating gain (G), equivalent resistance (REQ), and IBIAS.

FIG. 9 is a graph related to adjusting the clock frequency of the charge pump of FIG. 2 to select the lowest clock frequency for direct current (DC) to DC conversion efficiency.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
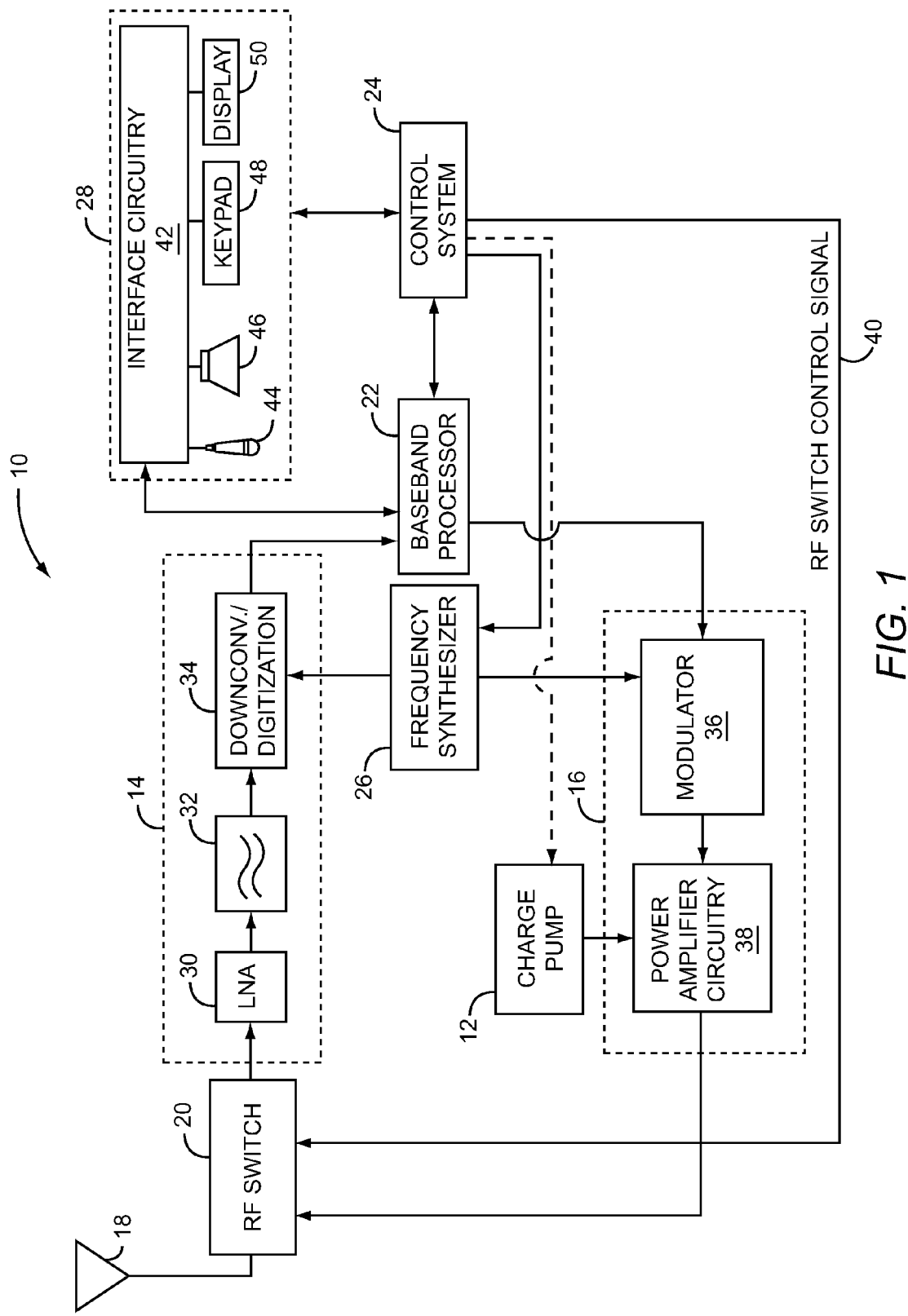
FIG. 1 is a block diagram of a mobile terminal that incorporates a charge pump that is in accordance with the present disclosure.

FIG. 1 depicts a mobile terminal 10 that incorporates a preferred embodiment of a charge pump 12 of the present disclosure. The mobile terminal 10 may be, but is not limited to a mobile telephone, a personal digital assistant (PDA), or the like. The basic architecture of the mobile terminal 10 may include a receiver front end 14, an radio frequency (RF) transmitter section 16, an antenna 18, an RF switch 20, a baseband processor 22, a control system 24, a frequency synthesizer 26, and an interface 28. The receiver front end 14 receives information-bearing RF signals from one or more remote transmitters provided by a base station (not shown). A low noise amplifier 30 amplifies the signal. A filter circuit 32 minimizes broadband interference in the received signal, while downconversion and digitization circuitry 34 downconverts the filtered, received signal to an intermediate or baseband frequency signal, which is then digitized into one or more digital streams. The receiver front end 14 typically uses one or more mixing frequencies generated by the frequency synthesizer 26.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs).

On the transmit side, the baseband processor 22 receives digitized data, which may represent voice, data, or control information, from the control system 24, which it encodes for transmission. The encoded data is output to the RF transmitter section 16, where it is used by a modulator 36 to modulate a carrier signal that is at a desired transmit frequency. Power amplifier (PA) circuitry 38 amplifies the modulated carrier signal to a level appropriate for transmission from the antenna 18. The amplified signal is sent through the RF switch 20 to the antenna 18. FIG. 1 depicts the charge pump 12 supplying power to the PA circuitry 38, but is to be understood that the charge pump 12 may also supply power to other elements of the mobile terminal 10 without deviating from the scope of the present disclosure. Moreover, as depicted using a dashed arrow, the control system 24 may control a gain select input of the charge pump 12 in response to varying battery voltage and load conditions as well as various operating modes and transmit power levels. Alternately, the gain select input may be controlled automatically within the charge pump 12 in response to varying battery voltage, etc. The RF switch 20 is controlled by an RF switch control signal 40 to switch the antenna 18 between the receiver front end 14 and the PA circuitry 38.

A user may interact with the mobile terminal 10 via the interface 28, which may include interface circuitry 42 associated with a microphone 44, a speaker 46, a keypad 48, and a display 50. The interface circuitry 42 typically includes analog-to-digital converters, digital-to-analog converters, amplifiers, and the like. Additionally, it may include a voice encoder/decoder, in which case it may communicate directly with the baseband processor 22.

The microphone 44 will typically convert audio input, such as the user's voice, into an electrical signal, which is then digitized and passed directly or indirectly to the baseband processor 22. Audio information encoded in the received signal is recovered by the baseband processor 22 and converted by the interface circuitry 42 into an analog signal suitable for driving the speaker 46. The keypad 48 and the display 50 enable the user to interact with the mobile terminal 10, inputting numbers to be dialed, address book information, or the like, as well as monitoring call progress information.

Figure 2:
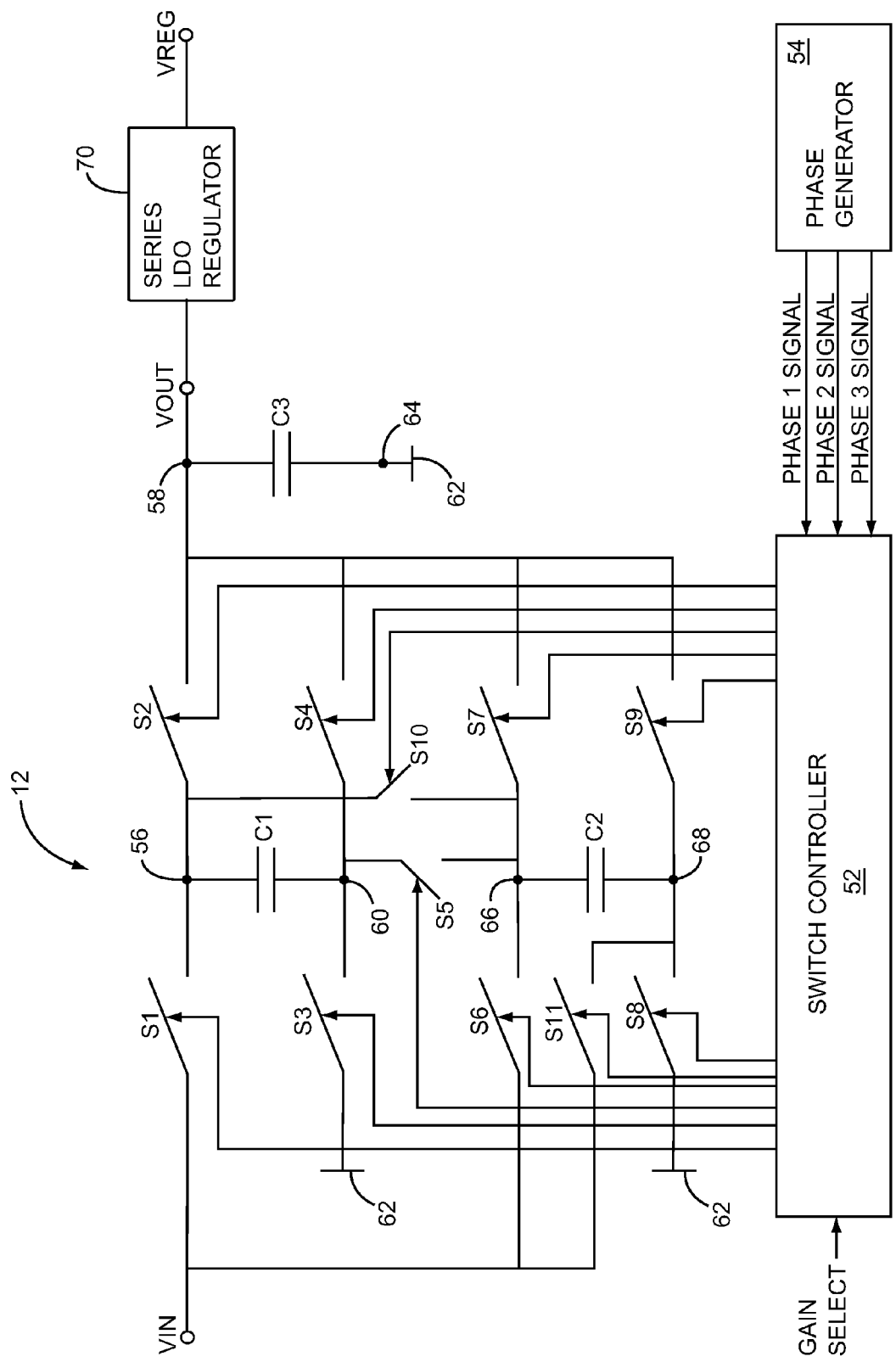
FIG. 2 is a circuit diagram of a charge pump according to the present disclosure.

FIG. 2 is a circuit diagram of the charge pump 12. The charge pump 12 includes eleven switches, S1 through S11, which selectively couple a first capacitor C1 and a second capacitor C2 to an output terminal VOUT in various configurations. The first capacitor C1 and the second capacitor C2 are known as flying capacitors. A holding capacitor C3 provides a stable reservoir of charge for the output terminal VOUT. Preferably, the switches S1 through S11 are transistor switches such as metal oxide semiconductor (MOS) transistors.

A switch controller 52 drives the switches S1 through S11 to open and close in response to a first phase signal referred to as a phase 1 signal, a second phase signal referred to as a phase 2 signal, and a third phase signal referred to as a phase 3 signal that are generated by a phase generator 54. The switch controller 52 can receive a gain select signal from the control system 24 (FIG. 1), or the switch controller 52 may automatically select an appropriate gain based upon a voltage level of an input terminal VIN and/or load demand.

The switches S1 through S9, along with the first capacitor C1, the second capacitor C2, and the holding capacitor C3, are configured to provide gains of ⅓, ½, and ⅔ when the switches S1 through S9 open and close in response to the phase 1 signal and the phase 2 signal. The phase 3 signal is usable with the phase 1 signal and the phase 2 signal to provide a gain of ¼ and a gain of ¾. The phase 3 signal drives the switch controller 52 to close the switches S3, S9, and S10 when the charge pump 12 is providing the ¼ gain. When the charge pump 12 is providing the ¾ gain, the phase 1 signal drives the switch controller 52 to close the switches S4, S10, and S11.

When the switch S1 is closed, it couples an input terminal VIN to a first terminal 56 of the first capacitor C1. An energy source such as a battery (not shown) is typically coupled to the input terminal VIN. A 3.6V Lithium ion battery would be a typical energy source when the charge pump 12 is used to power a circuit such as the PA circuitry 38 (FIG. 1) of the mobile terminal 10 (FIG. 1).

When the switch S2 is closed, it couples the first terminal 56 of the first capacitor C1 to a first terminal 58 of the holding capacitor C3. The output terminal VOUT is also coupled to the first terminal 58 of the holding capacitor C3.

When the switch S3 is closed, it couples a second terminal 60 of the first capacitor C1 to a fixed voltage node 62. The switch S4 couples the second terminal 60 of the first capacitor C1 to the first terminal 58 of the holding capacitor C3 when the switch S4 is closed. A second terminal 64 of the holding capacitor C3 is coupled to the fixed voltage node 62. The fixed voltage node 62 is preferably at ground potential, but the fixed voltage node 62 can be at other voltage levels.

When the switch S5 is closed, it couples the second terminal 60 of the capacitor C1 to a first terminal 66 of the second capacitor C2. The switch S6 couples the input terminal VIN to the first terminal 66 of the second capacitor C2 when the switch S6 is closed. The switch S7 couples the first terminal 66 of the second capacitor C2 to the first terminal 58 of the holding capacitor C3 when the switch S7 is closed. The switch S8 couples a second terminal 68 of the second capacitor C2 to the fixed voltage node 62 when the switch S8 is closed.

When the switch S9 is closed, it couples the second terminal 68 of the second capacitor C2 to the first terminal 58 of the holding capacitor C3. The switch S10 couples the first terminal 56 of the first capacitor C1 to the first terminal 66 of the second capacitor C2 when the switch S10 is closed. The switch S10 is preferably only closed during a switching process that provides the gain ¼. When the switch S11 is closed, the input terminal VIN is coupled to the second terminal 68 of the second capacitor C2.

In an embodiment of the charge pump 12, the first terminal 56 of the first capacitor C1, the first terminal 58 of the holding capacitor C3, and the first terminal 66 of the second capacitor C2 each has a positive polarity. In contrast, the second terminal 60 of the first capacitor C1, the second terminal 64 of the holding capacitor C3, and the second terminal 68 of the second capacitor C2 each has a negative polarity. Moreover, the output terminal VOUT of charge pump 12 may be coupled to a series low dropout (LDO) regulator 70 that is adapted to provide a regulated voltage at a terminal VREG. The terminal VREG is typically coupled to a power supply rail of the PA circuitry 38 (FIG. 1). However, the output terminal VOUT may be directly coupled to load circuitry without deviating from the scope of the present disclosure.

Figures 3, 4:
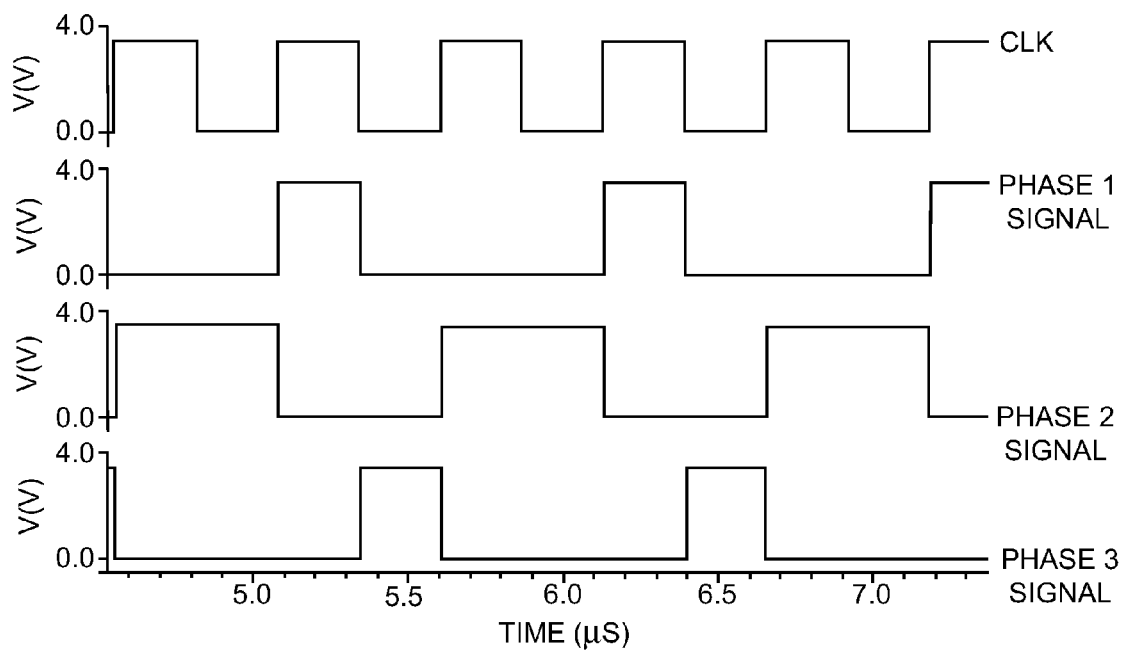
FIG. 3 is a switch response table relating the phase signals to the open and closed states of the switches of the charge pump of FIG. 2.
FIG. 4 is a timing diagram showing the relationships between a clock signal and three phase signals that open and close the switches of the charge pump of FIG. 2.

FIG. 3 is a switch response table relating the phase 1 signal, the phase 2 signal, and the phase 3 signal to the open and closed states of the switches S1 through S10. In order to provide the gain of ¼, the switches S1, S5, and S9 are closed in response to the phase 1 signal, while the remaining switches are opened or left open. The switches S7 and S8 are closed in response to the phase 2 signal, while the remaining switches are opened or left open, and the switches S3, S9, and S10 are closed in response to the phase 3 signal, while the remaining switches are opened or left open. The switches S2, S4, and S6 are continuously open while the gain of ¼ is provided.

The gain of ⅓ is provided when the switches S1, S5, and S9 are closed in response to the phase 1 signal, while the remaining switches are opened or left open. The switches S2, S3, S7, and S8 are closed in response to the phase 2 signal, while the remaining switches are opened or left open. The switches S4, S6, and S10 are continuously open while the gain of ⅓ is provided. No phase 3 signal is needed to produce the gain of ⅓.

In order to provide a gain of ½, the switches S1, S4, S6, and S9 are closed in response to the phase 1 signal, while the remaining switches are opened or left open, and the switches S2, S3, S7, and S8 are closed in response to the phase 2 signal, while the remaining switches are opened or left open. The switches S5 and S10 are continuously open, while the gain of ½ is provided. No phase 3 signal is needed to produce the gain of ½.

The gain of ⅔ is provided when the switches S1, S4, S6, and S9 are closed in response to the phase 1 signal, while the remaining switches are opened or left opened, and the switches S2, S5, and S8 are closed in response to the phase 2 signal, while the remaining switches are continuously open while the gain of ⅔ is provided. No phase 3 signal is needed to produce the gain of ⅔.

The gain of ¾ is provided when the switches S4, S10, and S11 are closed in response to the phase 1 signal, while the remaining switches are opened or left opened. The switches S6 and S9 are closed in response to the phase 2 signal, while the remaining switches are opened or left open, and the switches S2, S5, and S8 are closed in response to the phase 3 signal, while the remaining switches are opened or left open. The switches S1, S3, and S7 are continuously open while the gain of ¾ is provided.

FIG. 4 is a timing diagram showing the relationships between a clock signal CLK and the phase 1 signal, the phase 2 signal, and the phase 3 signal that open and close the switches of the charge pump 12 (FIG. 1 and FIG. 2). The clock signal CLK has a frequency of 2 MHz and a 50% duty cycle. The phase 1 signal and the phase 3 signal each have a frequency of 1 MHz with a 25% duty cycle. The phase 2 signal also has a frequency of 1 MHz, but the duty cycle of the phase 2 signal is 50%, which is double that of the phase 1 signal and the phase 3 signal. Thus, the phase 2 signal is considered to be unbalanced in comparison to the phase 1 signal and the phase 3 signal. As a practical matter, and as discussed in detail later in this disclosure, it is preferable to include a relatively small delay between a falling edge of one phase and a rising edge of an adjacent phase so that the phases are non-overlapped phases.

Figure 5A:
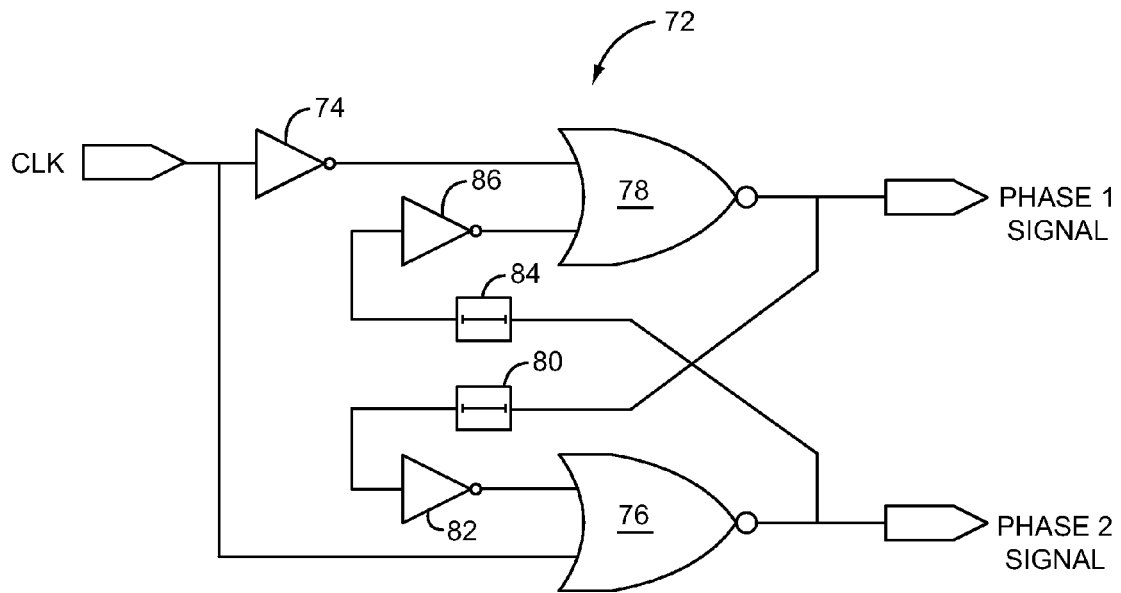
FIG. 5A is a digital logic schematic of a two-phase clock generator according to the present disclosure.

FIG. 5A depicts a two phase generator circuit 72 that generates the phase 1 signal and the phase 2 signal from the clock signal CLK. The clock signal CLK is received by an inverter 74 and a NOR gate 76. A NOR gate 78 receives an inverted clock signal output from the inverter 74 and outputs the phase 1 signal. The NOR gate 76 receives a delayed and inverted copy of the phase 1 signal that is processed through a fixed delay 80 and an inverter 82. In response to the clock signal CLK and the delayed and inverted copy of the phase 1 signal, the NOR gate 76 outputs the phase 2 signal. The NOR gate 78 receives a delayed and inverted copy of the phase 2 signal that is processed through a fixed delay 84 and an inverter 86. In response to the clock signal CLK and the delayed and inverted copy of the phase 2 signal.

Figure 5B:
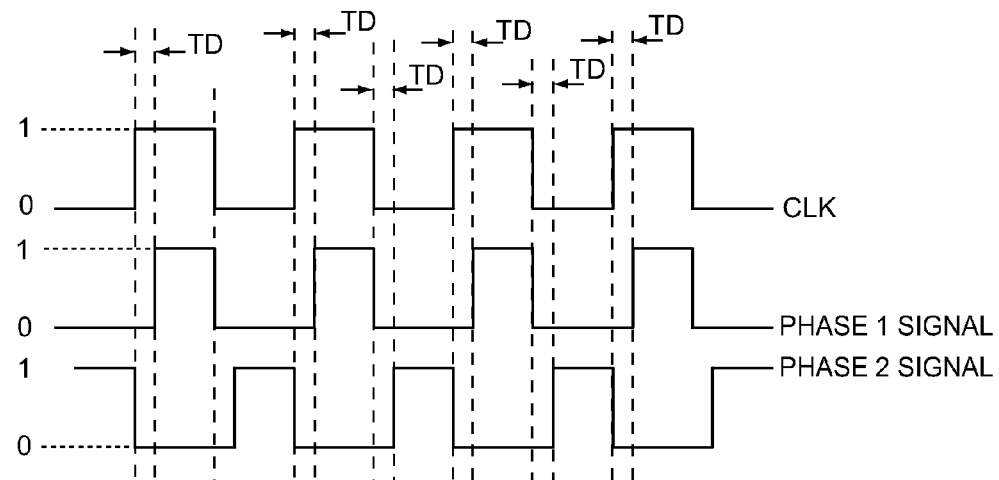
FIG. 5B is a timing diagram showing the relationships between the clock signal and two phase signals generated by the two-phase clock generator of FIG. 5A.

FIG. 5B illustrates the relative timing between the clock signal CLK, the phase 1 signal, and the phase 2 signal. Notice that the phase 1 signal and the phase 2 signal have the same frequency as the clock signal CLK. Moreover, the duty cycle of the phase 1 signal and the duty cycle of the phase 2 signal are equal. Since the frequencies and the duty cycles of the phase 1 signal and the phase 2 signal are equal, the phase 1 signal and the phase 2 signal are considered balanced.

The amplitudes of the clock signal CLK, the phase 1 signal, and the phase 2 signal are represented by the difference between a logic zero level and a logic one level. The logic one level of the phase 1 signal and the logic one level of the phase 2 signal each have a shorter duration than the logic one level of the clock signal CLK by a fixed delay interval TD. The fixed delay interval TD ensures that there is no overlap between the logic one levels of the phase 1 signal and the phase 2 signal.

Figure 6A:
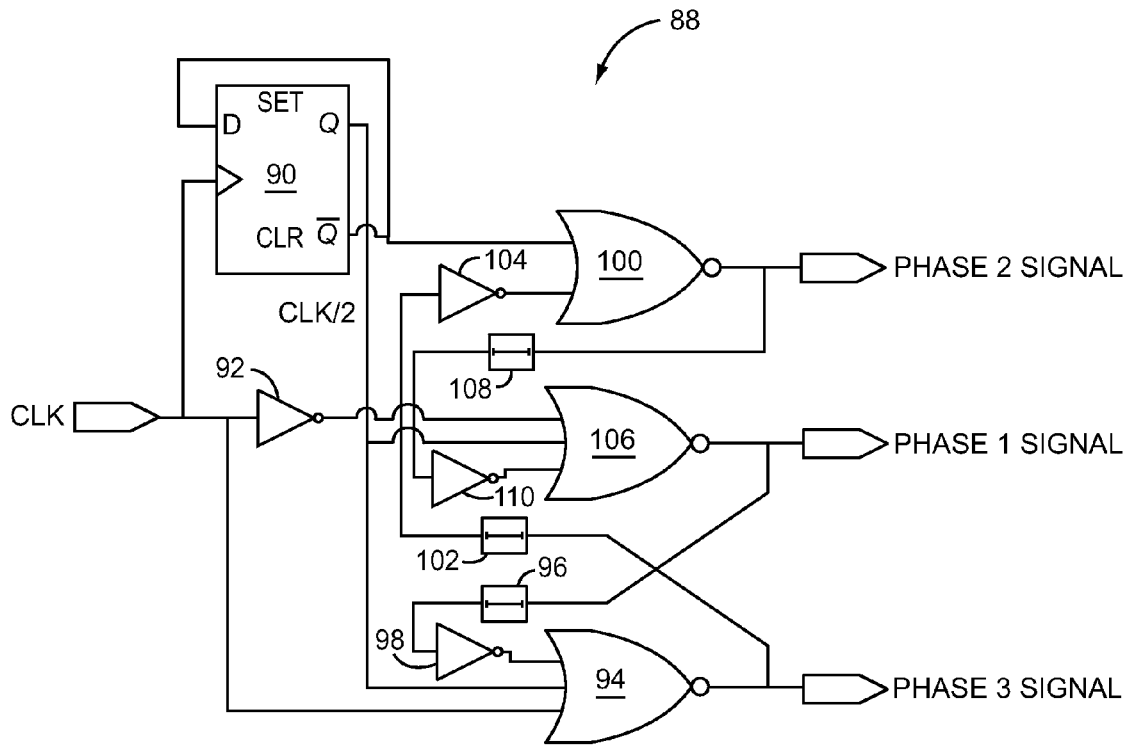
FIG. 6A is a digital logic schematic of a three-phase clock generator according to the present disclosure.

FIG. 6A depicts a three phase generator circuit 88 that generates the phase 1 signal, the phase 2 signal, and the phase 3 signal from the clock signal CLK. The clock signal CLK is received by a D-type flip-flop 90, an inverter 92, and a NOR gate 94. The D-type flip-flop 90 includes an input D, an output Q, and an output $\overline{Q}$. The output $\overline{Q}$ is coupled to the input D to provide feedback that results in a Q output of CLK/2, which in turn is received by the NOR gate 94. The NOR gate 94 also receives a delayed and inverted copy of the phase 1 signal that is processed through a fixed delay 96 and an inverter 98. In response to the clock signal CLK, the Q output of CLK/2, and the delayed and inverted copy of the phase 1 signal, the NOR gate 94 outputs the phase 3 signal.

A NOR gate 100 receives the $\overline{Q}$ output and a delayed and inverted copy of the phase 3 signal that is processed through a fixed delay 102 and an inverter 104. In response to the $\overline{Q}$ output and the delayed and inverted copy of the phase 3 signal, the NOR gate 100 outputs the phase 2 signal. A NOR gate 106 receives a delayed and inverted copy of the phase 2 signal that is processed through a fixed delay 108 and an inverter 110. In addition, the NOR gate 106 receives an inverted clock signal from the inverter 92 as well as the Q output of CLK/2. In response to the inverted copy of the phase 2 signal, the inverted clock signal, and the Q output of CLK/2, the NOR gate 106 outputs the phase 1 signal.

Figure 6B:
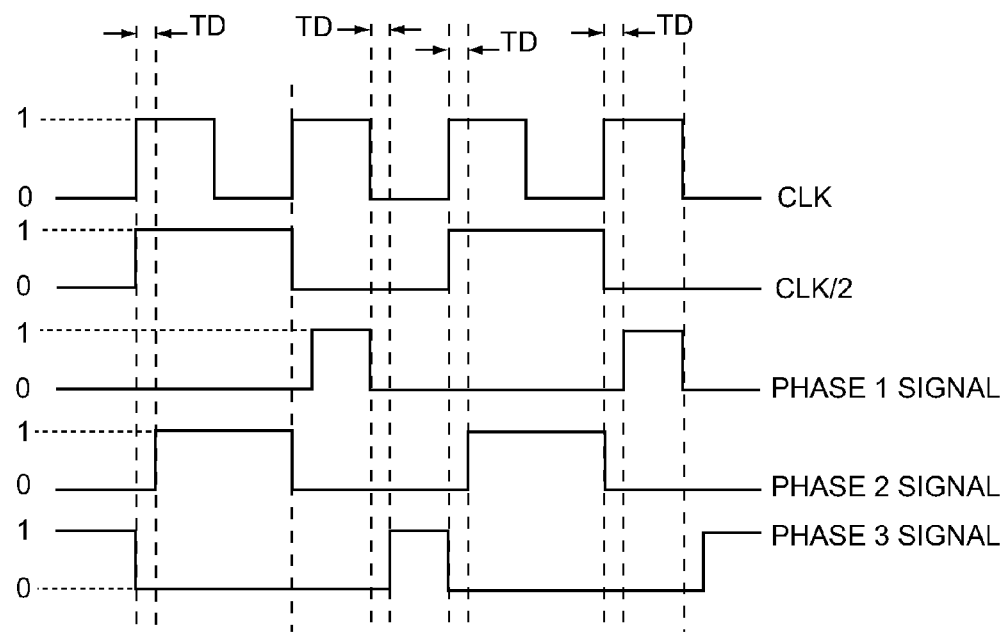
FIG. 6B is a timing diagram showing the relationships between the clock signal and three phase signals generated by the three-phase clock generator of FIG. 6A.

FIG. 6B illustrates the relative timing between the clock signal CLK, the Q output of CLK/2, the phase 1 signal, the phase 2 signal, and the phase 3 signal. The phase 1 signal, the phase 2 signal, and the phase 3 signal each have half the frequency of the clock signal CLK. The duty cycle of the phase 1 signal and the duty cycle of the phase 3 signal are equal. However, the duty cycle of the phase 2 signal is different from the duty cycle of the phase 1 signal and the duty cycle of the phase 3 signal. Hence, the three phase generator circuit 88 (FIG. 6A) generates unbalanced phases in accordance with the present disclosure. As shown in FIG. 6B, the duty cycle of the phase 1 signal and the duty cycle of the phase 3 signal is preferably 25% minus the fixed delay interval TD. In comparison, the duty cycle of the phase 2 signal is about twice that of the duty cycle of the phase 1 signal and the duty cycle of the phase 3 signal. In particular, the duty cycle of the phase 2 signal is preferably 50% minus the fixed delay interval TD.

Figure 7A:
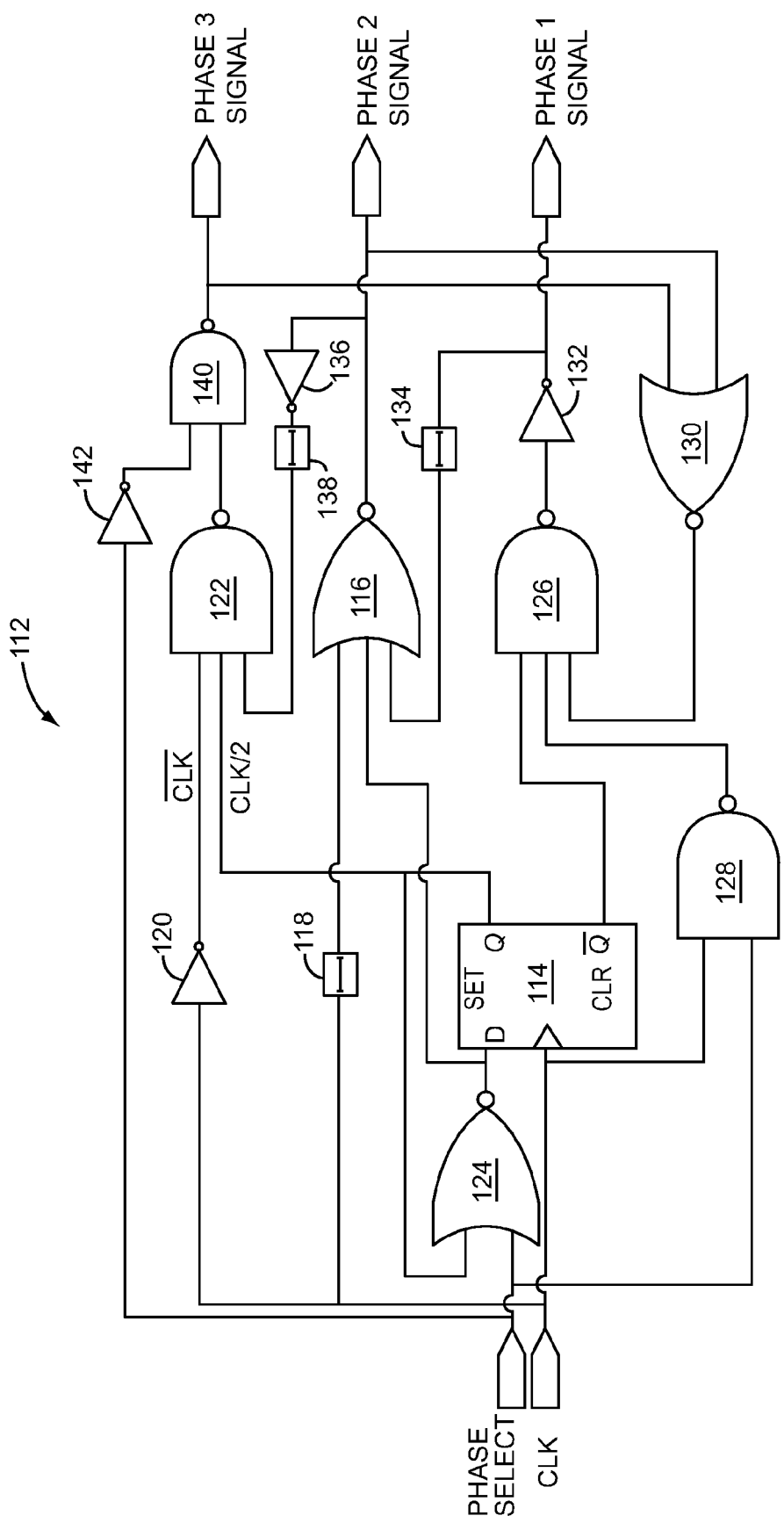
FIG. 7A is a digital logic schematic of a combined two-phase and three-phase clock generator according to the present disclosure.

FIG. 7A depicts a two and three phase generator circuit 112 that generates the phase 1 signal, the phase 2 signal, and the phase 3 signal from the clock signal CLK. The two and three phase generator circuit 112 includes a PHASE SELECT input for selecting either a two phase generation mode or a three phase generation mode. The clock signal CLK is received by a D-type flip-flop 114, a NOR gate 116 via a fixed delay 118, and an inverter 120. A NAND gate 122 receives an inverted clock signal $\overline{CLK}$ from the inverter 120.

The D-type flip-flop 114 includes an input D, an output Q, and an output $\overline{Q}$. The output Q is fed back to the input D via a NOR gate 124 that also receives a logic one level or a logic zero level at the PHASE SELECT input. A logic one level selects the output of the phase 1 signal and the phase 2 signal with no phase 3 signal output, whereas a logic zero level selects the output of the phase 1 signal, the phase 2 signal, and the phase 3 signal. For example, when the PHASE SELECT input is at a logic zero level, the NOR gate 124 allows feedback of the output Q into the input D, thereby facilitating the generation of the CLK/2 signal. However, when the PHASE SELECT input is at a logic one level, the NOR gate 124 forces the input D to a logic zero level, thereby stopping the generation of the CLK/2 signal. The output $\overline{Q}$ is the inverse of the output Q. Therefore, the output $\overline{Q}$ provides an inverted copy of the CLK/2 signal when the PHASE SELECT input is at a logic zero level. Alternately, the $\overline{Q}$ output will be at a logic one level in response to a logic one level at the PHASE SELECT input.

A NAND gate 126 receives output from a NAND gate 128 that receives an input of the clock signal CLK and a logic one level or logic zero level at the PHASE SELECT input. The output of the NAND gate 128 is at a logic one level when the PHASE SELECT input is at a logic zero level. Conversely, when the PHASE SELECT input is at a logic one level, the output of the NAND gate 128 is an inverted copy of the CLK signal. The NAND gate 126 also receives output from a NOR gate 130 that receives an input of the phase 2 signal and an input of the phase 3 signal. In response to the output $\overline{Q}$, the inverted copy of the CLK signal, and the output of the NOR gate 130, the NAND gate 126 outputs an inverted copy of the phase 1 signal. An inverter 132 inverts the inverted copy of the phase 1 signal to provide the phase 1 signal.

The phase 1 signal is received by the NOR gate 116 after a time delay provided by a fixed delay 134. The phase 2 signal is output from the NOR gate 116 in response to the delayed phase 1 signal, the logic level of the D input of the flip-flop 114, and the clock signal CLK delayed by the fixed delay 118.

The phase 2 signal is inverted by an inverter 136 before the phase 2 signal is received by the NAND gate 122 after a time delay provided by a fixed delay 138. The NAND gate 122 provides an output in response to the inverted and delayed phase 2 signal, the $\overline{CLK}$ signal output from the inverter 120, and the CLK/2 signal provided at the Q output of the D-type flip-flop 114. The phase 3 signal is output from a NAND gate 140 in response to a PHASE SELECT logic level that is inverted by an inverter 142, and the output of the NAND gate 122.

Figure 7B:
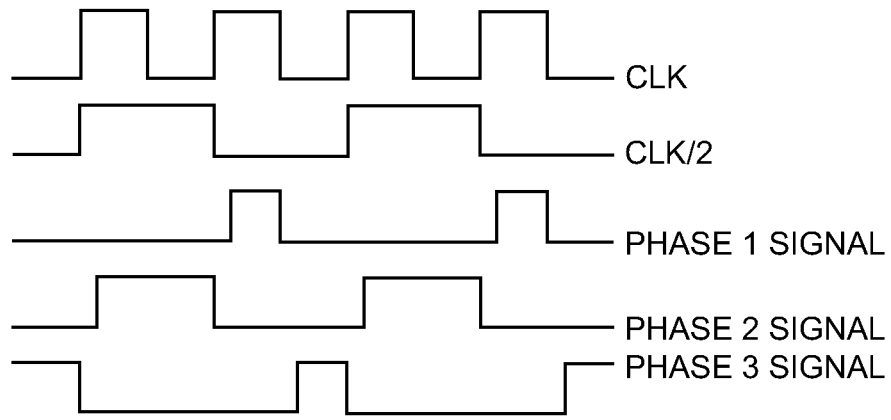
FIG. 7B is a timing diagram showing the relationships between the clock signal and three phase signals generated by the combined two-phase and three-phase clock generator of FIG. 7A with a PHASE SELECT input of a logic zero.

As shown in FIG. 7B, the phase 1 signal will have a frequency equal to CLK/2 when the PHASE SELECT input is at a logic zero level. Conversely, when the PHASE SELECT input is at a logic one level, the phase 1 signal will have a frequency equal to the clock signal CLK. Regardless of the PHASE SELECT input logic level, the phase 1 signal will be at a logic one level for a time approximately equal to one-half of the period of the clock signal CLK minus a fixed delay during each cycle of the phase 1 signal. In this way, the phase 1 signal will have a duty cycle of approximately 25% when the PHASE SELECT input is at a logic zero level. In contrast, the phase 1 signal will have a duty cycle approximately equal to the 50% duty cycle of the clock signal CLK when the PHASE SELECT input is at a logic one level. As a practical matter, the logic one level of the phase 1 signal preferably has a slightly shorter duration than one-half of the period of the clock signal CLK by a fixed delay to ensure non-overlapping switching of the charge pump 12 (FIG. 2).

Figure 7C:
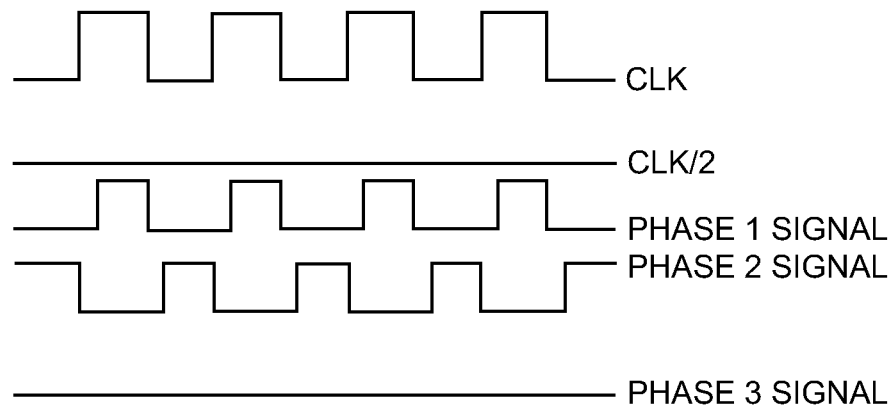
FIG. 7C is a timing diagram showing the relationships between the clock signal and the three phase signals generated by the combined two-phase and three-phase clock generator of FIG. 7A with a PHASE SELECT input of a logic one.

As shown in FIG. 7C, the phase 2 signal will have a frequency equal to CLK/2 when the PHASE SELECT input is at a logic zero level. Moreover, during each cycle of the phase 2 signal, the phase 2 signal will be at a logic one level for a time equal to the period of the clock signal CLK. Conversely, when the PHASE SELECT input is at a logic one level, the phase 2 signal will have a frequency equal to the clock signal CLK. Also, the phase 2 signal will be at a logic one level for a time equal to one-half the period of the clock signal CLK. Therefore, the phase 2 signal will have a duty cycle of approximately 50% regardless of the logic level of the PHASE SELECT input. As a result, the phase 1 signal will be balanced with the phase 2 signal when the PHASE SELECT input is at a logic one level, and the phase 1 signal will be unbalanced with the phase 2 signal and the phase 3 signal when the PHASE SELECT input is at a logic zero level. As with the phase 1 signal, the logic one level of the phase 2 signal is preferably slightly shorter in duration than one-half of the period of the clock signal CLK by a fixed delay. The slightly shorter duration of the logic one level of the phase 2 signal ensures non-overlapping switching of the charge pump 12 (FIG. 2).

FIG. 8A is a diagram of a simplified electrical model of the charge pump 12 of FIG. 2. The output voltage VOUT across a load is the gain G multiplied by the input voltage VIN minus an equivalent resistance REQ multiplied by a load current ILOAD. An input current IIN typically drawn from a battery (not shown) is equal to the gain G multiplied by the load current ILOAD plus a bias current IBIAS, which is tabulated in FIG. 8B.

A simulation of the simplified electrical model yields the table of FIG. 8B. The simulation was conducted with an input voltage VIN equal to 3.6V and a clock signal CLK frequency of 2 MHz. Moreover, the capacitor C1 (FIG. 2) and the capacitor C2 typically each have a capacitance of 220 nF. The performance of the charge pump 12 is defined by the equivalent resistance REQ and the bias current IBIAS. For example, when the gain G is selected to be ⅓, the input current IIN will be ⅓ the load current ILOAD plus the bias current IBIAS.

FIG. 9 is a graph that relates to adjusting the switching frequency of the switches S1 through S10 to a lowest possible frequency for gains of ¼ and ⅓ for the charge pump 12 (FIG. 2). In particular, the graph of FIG. 9 is a plot of the voltage of the output terminal VOUT versus the load current ILOAD that identifies conditions that require a change in switching frequency or a change in gain G. A change in switching frequency may be achieved via a change of the clock signal CLK (FIG. 4). The phase generator 54 (FIG. 2) is adapted to automatically adjust the clock signal CLK in response to varying conditions represented in the graph of FIG. 9. A first graph region 144 shows where the charge pump 12 is operated to provide a gain of ¼ at a first clock signal frequency FCLK1 that is less than a second clock signal frequency FCLK2. A second graph region 146 shows an extension wherein the charge pump 12 continues to operate to provide a gain of ¼. However, during operation of the charge pump 12 in the second region 146, the first clock frequency is replaced with the second clock signal frequency FCLK2.

Since the second clock signal frequency FCLK2 is greater than the first clock signal frequency FCLK1, the equivalent resistance REQ (FIG. 8A) is reduced, but with a penalty of degraded efficiency in comparison with the charge pump 12 being operated at the first clock signal frequency FCLK1. A third graph region 148 shows where the charge pump 12 is operated to provide the gain of ⅓ while operating at the first clock signal frequency FCLK1, which is lower in frequency and more efficient than operating the charge pump 12 at the higher frequency of the second clock signal frequency FCLK2. A straight dotted and dashed line 150 having a positive slope that traverses the first graph region 144, the second graph region 146, and the third graph region 148 represents a target value for the regulated voltage VREG over a range of load current ILOAD. A solid line 152 represents the voltage of the output terminal VOUT by the charge pump 12 when operated at the first clock frequency FCLK1 while providing the gain of ¼. A dashed line 154 represents the voltage of the output terminal VOUT by the charge pump 12 when operated at the second clock frequency FCLK2 while also providing the gain of ¼.

Notice that a voltage headroom at a first operation changeover point 156 begins to relatively rapidly or non-linearly decrease at the end of the first graph region 144. An automatic frequency changeover at the first operation changeover point 156 switches the operation of the charge pump 12 from the first clock signal frequency FCLK1 to the second clock signal frequency FCLK2. While the charge pump 12 is operating in the second graph region 146, the voltage headroom remains above the voltage headroom of the first operation changeover point 156 until a second operation changeover point 158 is reached where the voltage headroom once again begins to rapidly decrease. However, instead of changing to yet another clock signal frequency, it is preferable to change the gain provided by the charge pump 12 from the gain of ¼ to the gain of ⅓.

Those skilled in the art will recognize improvements and modifications to the preferred embodiments of the present disclosure. All such improvements and modifications are considered within the scope of the concepts disclosed herein and the claims that follow.

What is claimed is:

1. A charge pump comprising:
an input, an output, and a fixed voltage node;
a first flying capacitor and a second flying capacitor, each having a first terminal and a second terminal;
a plurality of switches configured to selectively couple the first terminal and the second terminal of the first flying capacitor and the second flying capacitor to the input, the output, and the fixed voltage node, the plurality of switches consisting of eleven switches;
a switch controller configured to open and close select ones of the plurality of switches in response to a first phase signal, a second phase signal, and a third phase signal in order to provide at the output a set of fixed gains of a voltage at the input comprising ¼ and ¾; and
a phase generator configured to generate the first phase signal, the second phase signal, and the third phase signal, wherein a duty cycle of one of the first phase signal, the second phase signal, and the third phase signal is different from a duty cycle of one other of the first phase signal, the second phase signal, and the third phase signal.

2. The charge pump of claim 1, wherein each duty cycle of the first phase signal and the third phase signal is approximately 25%, and the duty cycle of the second phase signal is approximately 50%.

3. The charge pump of claim 1, wherein the phase generator introduces a fixed delay interval between a falling edge of the first phase signal and a rising edge of the second phase signal such that the first phase signal and the second phase signal are non-overlapped.

4. The charge pump of claim 1, wherein the phase generator introduces a fixed delay interval between a falling edge of the second phase signal and a rising edge of the third phase signal such that the second phase signal and the third phase signal are non-overlapped.

5. The charge pump of claim 1, wherein the phase generator uses a clock signal having a given frequency to generate the first phase signal, the second phase signal, and the third phase signal, each having half the given frequency of the clock signal.

6. The charge pump of claim 1, wherein the first flying capacitor and the second flying capacitor each have a value of capacitance of approximately 220 nF.

7. The charge pump of claim 1, wherein the phase generator is configured to automatically adjust a frequency of a clock signal in response to varying voltage conditions at the input and/or the output of the charge pump.

8. The charge pump of claim 7, wherein the phase generator automatically increases the frequency of the clock signal to extend operation of the charge pump when a voltage headroom between a target voltage and an output voltage at the output begins to non-linearly decrease.

9. The charge pump of claim 8, wherein the target voltage is provided by a low dropout regulator coupled to the output of the charge pump.

10. The charge pump of claim 1 wherein the only capacitors in the charge pump are the first flying capacitor, the second flying capacitor, and an output capacitor.

11. A charge pump comprising:
an input, an output, and a fixed voltage node;
a first flying capacitor and a second flying capacitor, each having a first terminal and a second terminal;
a plurality of switches configured to selectively couple the first terminal and the second terminal of the first flying capacitor and the second flying capacitor to the input, the output, and the fixed voltage node, the plurality of switches comprising:
a first switch coupled between the input and the first terminal of the first flying capacitor;
a second switch coupled between the first terminal of the first flying capacitor and the output;
a third switch coupled between ground and the second terminal of the first flying capacitor;
a fourth switch coupled between the second terminal of the second flying capacitor and the output;
a fifth switch coupled between the second terminal of the first flying capacitor and the first terminal of the second flying capacitor;
a sixth switch coupled between the input and the first terminal of the second flying capacitor;
a seventh switch coupled between the first terminal of the second flying capacitor and the output;
an eighth switch coupled between ground and the second terminal of the second flying capacitor;
a ninth switch coupled between the second terminal of the second flying capacitor and the output;
a tenth switch coupled between the first terminal of the first flying capacitor and the first terminal of the second flying capacitor; and
an eleventh switch coupled between the input and the second terminal of the second flying capacitor;
a switch controller configured to open and close select ones of the plurality of switches in response to a first phase signal, a second phase signal, and a third phase signal in order to provide at the output a set of fixed gains of a voltage at the input comprising ¼, ⅓, ½, ⅔, and ¾; and
a phase generator configured to generate the first phase signal, the second phase signal, and the third phase signal, wherein a duty cycle of one of the first phase signal, the second phase signal, and the third phase signal is different from a duty cycle of one other of the first phase signal, the second phase signal, and the third phase signal.

12. The charge pump of claim 11 wherein the only capacitors in the charge pump are the first flying capacitor, the second flying capacitor, and an output capacitor.

13. The charge pump of claim 12 wherein the output capacitor is coupled between the output and ground.

14. A mobile terminal comprising:
a power amplifier (PA) for amplifying signals to be transmitted from the mobile terminal;
a receiver to receive signals to be processed by the mobile terminal; and
a charge pump configured to supply power to the PA, the charge pump comprising:
an input, an output, and a fixed voltage node;
a first flying capacitor and a second flying capacitor, each having a first terminal and a second terminal;
a plurality of switches configured to selectively couple the first terminal and the second terminal of the first flying capacitor and the second flying capacitor to the input, the output, and the fixed voltage node, the plurality of switches consisting of eleven switches;
a switch controller configured to open and close select ones of the plurality of switches in response to a first phase signal, a second phase signal, and a third phase signal in order to provide at the output a set of fixed gains of a voltage at the input comprising ¼ and ¾; and
a phase generator configured to generate the first phase signal, the second phase signal, and the third phase signal, wherein the duty cycle of one of the first phase signal, the second phase signal, and the third phase signal is different from the duty cycle of one other of the first phase signal, the second phase signal, and the third phase signal.

15. The mobile terminal of claim 14, wherein the set of fixed gains comprises ¼, ⅓, ½, ⅔, and ¾.

16. The charge pump of claim 14, wherein each duty cycle of the first phase signal and the third phase signal is approximately 25%, and the duty cycle of the second phase signal is approximately 50%.

17. The mobile terminal of claim 14, wherein the phase generator introduces a fixed delay interval between a falling edge of the first phase signal and a rising edge of the second phase signal such that the first phase signal and the second phase signal are non-overlapped.

18. The mobile terminal of claim 14, wherein the phase generator introduces a fixed delay interval between a falling edge of the second phase signal and a rising edge of the third phase signal such that the second phase signal and the third phase signal are non-overlapped.

19. The mobile terminal of claim 14, wherein the phase generator uses a clock signal having a given frequency to generate the first phase signal, the second phase signal, and the third phase signal, each having half the given frequency of the clock signal.

20. The mobile terminal of claim 14, wherein the first flying capacitor and the second flying capacitor each have a capacitance of approximately 220 nF.

21. The mobile terminal of claim 14, wherein the phase generator is configured to automatically adjust a frequency of a clock signal in response to varying voltage conditions at the input and/or the output of the charge pump.

22. The mobile terminal of claim 21, wherein the phase generator automatically increases the frequency of the clock signal to extend operation of the charge pump when a voltage headroom between a target voltage and an output voltage at the output begins to non-linearly decrease.

23. The mobile terminal of claim 22, wherein the target voltage is provided by a low dropout regulator coupled to the output of the charge pump.

24. The mobile terminal of claim 14 wherein the only capacitors in the charge pump are the first flying capacitor, the second flying capacitor, and an output capacitor.

* * * * *